United States Patent [19]
Linzer et al.

[11] Patent Number: 6,141,447
[45] Date of Patent: *Oct. 31, 2000

[54] COMPRESSED VIDEO TRANSCODER

[75] Inventors: Elliot N. Linzer, Bronx; Aaron Wells, New Rochelle, both of N.Y.

[73] Assignee: C-Cube Microsystems, Inc., Milpitas, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/755,447

[22] Filed: Nov. 21, 1996

[51] Int. Cl.$^7$ ................................................... G06K 9/36
[52] U.S. Cl. ............................................................ 382/236
[58] Field of Search .................................... 382/232, 236, 382/238, 240, 248, 250; 348/384, 394, 395, 400–404, 407–416, 420, 421, 425, 430, 431

[56] References Cited

U.S. PATENT DOCUMENTS

| | | | |
|---|---|---|---|
| 4,545,066 | 10/1985 | Gascuel et al. | 382/182 |
| 4,692,801 | 9/1987 | Ninoyima et al. | 348/415 |
| 4,745,459 | 5/1988 | Ninoyima et al. | 348/431 |
| 4,763,283 | 8/1988 | Coutrot | 382/166 |
| 4,825,285 | 4/1989 | Speidel et al. | 382/248 |
| 4,979,037 | 12/1990 | Mizutani et al. | 348/424 |
| 5,091,782 | 2/1992 | Krause et al. | 382/236 |
| 5,144,427 | 9/1992 | Kiatura et al. | 348/424 |
| 5,146,325 | 9/1992 | Ng | 382/236 |
| 5,185,819 | 2/1993 | Ng et al. | 382/234 |
| 5,347,308 | 9/1994 | Wai | 348/390 |
| 5,461,679 | 10/1995 | Normile et al. | 382/304 |
| 5,544,266 | 8/1996 | Koppelmans et al. | 382/238 |
| 5,602,589 | 2/1997 | Vishwanath et al. | 382/240 |
| 5,661,523 | 8/1997 | Yamane | 348/415 |
| 5,675,424 | 10/1997 | Park | 382/234 |
| 5,680,483 | 10/1997 | Tranchard | 382/239 |
| 5,694,170 | 12/1997 | Tiwari et al. | 382/234 |
| 5,708,473 | 1/1998 | Mead | 382/244 |
| 5,761,343 | 6/1998 | Haruma et al. | 382/236 |
| 5,768,535 | 6/1998 | Chaddha et al. | 382/232 |
| 5,774,592 | 6/1998 | Takeuchi et al. | 382/234 |

*Primary Examiner*—Jose L. Couso
*Attorney, Agent, or Firm*—Proskauer Rose LLP

[57] ABSTRACT

Compressed video transcoding apparatus and methods are disclosed. One embodiment eliminates the need for reorder buffers by utilizing an encode order video decoder which decodes a first compressed video bit stream to provide a sequence of frames in an encode order suitable for direct encoding without further reordering. An encode order video encoder receives the sequence of frames in encode order and directly encodes the frames without further reordering to provide a second compressed video bit stream. Another embodiment utilizes a frame reorder device to reorder compressed frames of a first compressed video bit stream into an encode order such that a subsequent encoding operation after decoding the first compressed video bit stream can be performed without further reordering of the frames. The reordered compressed frames are decoded and applied in the encode order to an encoder which encodes the frames to provide a second compressed video bit stream. Another embodiment includes a decoder which decodes a first compressed video bit stream to provide a sequence of decoded frames. The sequence of decoded frames is applied to an encoder along with auxiliary information regarding the first compressed video bit stream. The encoder utilizes the auxiliary information to simplify encoding of the decoded frame sequence. The auxiliary information may include motion vectors, quantization scale, number of bits used, motion compensation mode and repeat field indications for the first compressed video bit stream.

16 Claims, 8 Drawing Sheets

COMPRESSED VIDEO TRANSCODER

FIELD OF THE INVENTION

The present invention relates generally to digital video encoding and decoding and more particularly to compressed video transcoders which decode and subsequently re-encode compressed video bit streams.

BACKGROUND OF INVENTION

A compressed video transcoder decodes a compressed video bit stream and subsequently re-encodes the decoded bit stream. Video transcoders are therefore particularly useful in video servers and other applications in which a particular compressed video bit stream must be delivered using different bit rates, resolutions or formats depending on factors such as network congestion, decoder capability or requests from end users. A number of non-transcoder techniques can also provide these features. For example, a video server could store multiple copies of the same video sequence encoded at different bit rates, resolutions or formats. However, such an approach requires large amounts of disk storage space and only provides a limited number of discrete selections. Another non-transcoder technique involves storing a video sequence in a compressed "scalable" form. However, this technique also provides only a limited number of selections, and requires more complex encoders at the video server. Transcoding techniques are generally superior to these and other non-transcoder techniques in that a very large number of bit rate, resolution and format selections can be accommodated using conventional encoders and decoders. A transcoder-based video server may store an encoded video sequence using a given bit rate, resolution and format. When the stored stream has to be subsequently delivered at a different bit rate, resolution or format, the video server retrieves the stored stream and applies it to a transcoder.

Figure 1:
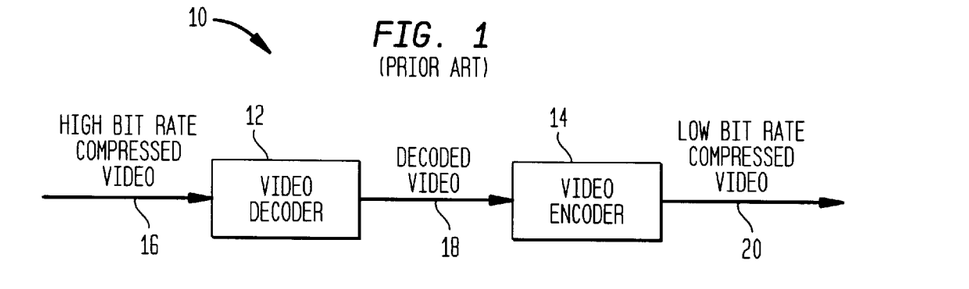
FIG. 1 shows a conventional video transcoder.

FIG. 1 shows an exemplary transcoder 10 which includes a video decoder 12 and a video encoder 14. The video decoder 12 receives a high bit rate compressed video bit stream on an input 16, decodes the high bit rate stream to produce a frame sequence of decoded video pixels, and supplies the decoded video via line 18 to the video encoder 14. The encoder 14 re-encodes the decoded frame sequence using a lower bit rate and resolution, and produces a low bit rate compressed video bit stream at output 20. Although this transcoding approach has the advantage of flexibility in terms of the number of different bit rates, resolutions and formats which can be simultaneously supported, the conventional transcoder 10 is relatively complex and expensive in that it requires both a complete decoder 12 and a complete encoder 14. For example, a transcoder 10 suitable for use in MPEG-2 transcoding applications generally must include encoder reorder buffers for holding bidirectionally-predicted (B) frames until the forward-only predictive (P) or intra-coded (I) frames that precede the B frames in the frame sequence supplied from the decoder are encoded. This is because the decoder supplies the frames in an order suitable for presentation, rather than in an order suitable for direct encoding. The B frames are stored in an uncompressed form which generally requires substantial amounts of memory.

Figure 2:
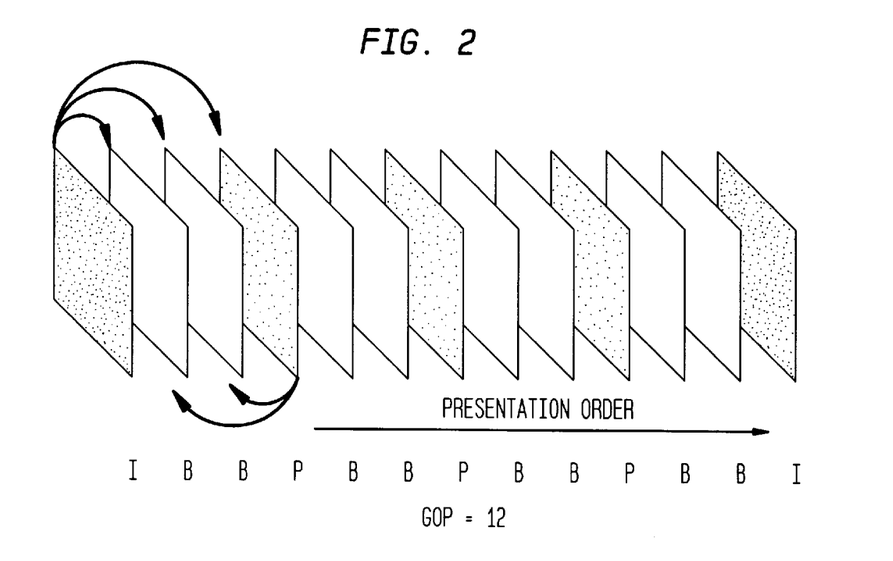
FIG. 2 is a frame sequence illustrating the need for uncompressed frame reorder buffering in a conventional transcoder.

FIG. 2 illustrates a sequence of MPEG-2 frames which may be applied to the encoder 14 in transcoder 10. The frame sequence shown includes a single group of pictures (GOP) of size 12. The picture type is noted under each frame of the GOP. It can be seen that the GOP begins and ends with an I frame, and includes both B and P frames. The arrows indicate the frames needed to decode or encode the first two B frames in the presentation order. The first and second B frames are each encoded using both the first I frame and the first P frame. The decoder 1 2 of FIG. 1 arranges the GOP in the presentation order shown in FIG. 2. The above-noted reorder buffers of encoder 14 are used to hold the first and second B frames until the first P frame required to encode these B frames is received from the decoder 12. This unduly increases the memory requirements of the conventional transcoder 10. The encoder 14 of transcoder 10 also generally must convert fields to frames and perform other encoding operations such as repeat field detection, motion estimation, and rate control based solely on the decoded video pixels. These encoder requirements further increase the cost and complexity of the transcoder.

As is apparent from the above, there is a need for a compressed video transcoder which can provide the flexibility advantages of a conventional transcoder but without the cost and complexity associated with a complete encoder and decoder.

SUMMARY OF THE INVENTION

The present invention provides improved compressed video transcoders which may be implemented without a complete encoder and a complete decoder.

A first exemplary embodiment of the invention is a transcoder with an encode order video decoder which receives a first compressed video bit stream. The encode order video decoder decodes the first compressed video bit stream to provide a sequence of frames in an order suitable for direct encoding without further reordering. The transcoder further includes an encode order video encoder which receives a sequence of frames in an encode order from the decoder. The encoder can directly encode the sequence of frames to provide a second compressed video bit stream without further reordering of the frames. The transcoder can thus be implemented without reorder buffers, and therefore at a considerably reduced cost and complexity relative to conventional transcoders.

Another exemplary embodiment of the invention is a transcoder with a compressed frame reorder device which receives a first compressed video bit stream including only intra-coded (I) frames. The reorder device reorders compressed frames of the first compressed video bit stream into an encode order such that a subsequent encoding operation performed after decoding the first compressed video bit stream can be performed without further reordering of the frames. A decoder receives the reordered compressed frames of the first compressed video bitstream. The decoder decodes the reordered compressed frames to provide a sequence of decoded video frames in the encode order. An encoder receives the decoded video frames in the encode order from the decoder and generates therefrom an inter-frame encoded second compressed video bit stream without further reordering of the decoded video frames. This exemplary transcoder utilizes compressed frame buffers rather than conventional uncompressed frame buffers, and therefore can be implemented at a reduced cost and complexity relative to conventional transcoders.

Another exemplary embodiment of the invention is a transcoder including a video decoder which receives a first compressed video bit stream. The video decoder decodes the first compressed video bit stream to provide a sequence of frames which is delivered to a video encoder. The video decoder also supplies auxiliary information regarding the first compressed video bit stream to the encoder. The auxiliary information may include motion vectors, number of bits, quantization scales and motion compensation mode used in at least one region of a picture in the first compressed video bit stream. Other exemplary auxiliary information may include a repeat field indication for a picture in the first compressed video bit stream. The encoder utilizes the auxiliary information to facilitate the encoding of the frame sequence supplied by the decoder. The transcoder can therefore be implemented using a reduced-complexity encoder.

These and other features and advantages of the present invention will become more apparent from the accompanying drawings and the following detailed description.

DETAILED DESCRIPTION OF THE INVENTION

The present invention will be illustrated using several exemplary transcoders particularly well-suited for use in video decoding applications. The transcoders may also be utilized for other types of transcoding including transcoding of signals other than compressed video bit streams. The invention is suitable for use with MPEG-2 video encoding as well as other types of encoding including JPEG and Digital Video Cassette (DVC) encoding. Although the illustrative embodiments below will generally refer to video frames, it should be understood that the transcoding operations could also be field-based in appropriate video processing applications. The term "picture" as used herein refers generally to either video frames or video fields. It should also be noted that although the illustrative transcoder embodiments described herein convert high bit rate compressed video to low bit rate compressed video, this is by way of example and not limitation. The transcoders of the present invention are more generally suitable for providing any desired translation between first and second compressed video streams.

Figure 3:
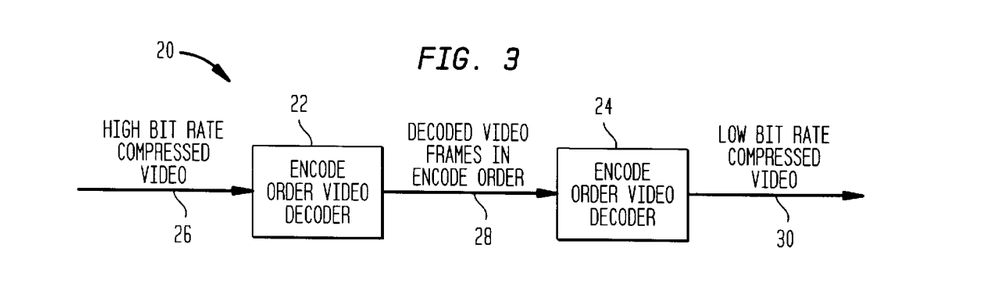
FIG. 3 shows a video transcoder without reorder buffers in accordance with the present invention.

FIG. 3 shows an exemplary transcoder 20 in accordance with the present invention. The transcoder 20 includes an encode order video decoder 22 and an encode order video encoder 24. Unlike a conventional transcoder, the transcoder 20 does not include reorder buffers. A high bit rate compressed video bit stream is received in the transcoder 20 on an input 26 of the encode order decoder 22. The decoder 22 decodes the video bit stream but does not reorder the frames. As noted above, a conventional transcoder includes a complete decoder which as part of the decoding process will reorder the decoded frames into an appropriate presentation order. The present invention recognizes that in many transcoding applications this reordering is unnecessary. The encode order decoder 22 therefore outputs on line 28 a sequence of decoded video frames in an order suitable for encoding. The encode order encoder 24 receives the sequence of decoded frames and can directly encode the frames at a lower bit rate without the need for reorder buffers. The encoder 24 outputs on line 30 a low bit rate compressed video bit stream.

The reorder buffers can be eliminated in the transcoder 20 of FIG. 3 because it is no longer necessary to hold bidirectionally-predicted (B) frames until the forward-only predictive (P) or intra-coded (I) frames that precede the B frames in presentation order are encoded. The frames are supplied from the encode order decoder 22 to the encode order encoder 24 in an order appropriate for encoding. By eliminating the processing and memory requirements associated with frame reordering, the transcoder 20 exhibits reduced hardware and processing complexity relative to conventional transcoders. The transcoder 20 is particularly well-suited for use in those MPEG-2 video applications in which it is reasonable to assume that indicators such as picture_coding_type and repeat_first_field remain the same for the frames of both the input and output encoded video bit streams.

Figure 4:
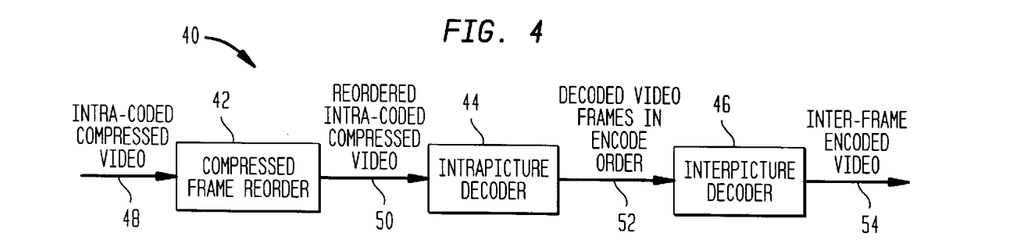
FIG. 4 shows a video transcoder with compressed reorder buffers in accordance with the present invention.

FIG. 4 shows another exemplary transcoder 40 in accordance with the present invention. The transcoder 40 includes a compressed frame reorder device 42, an intra-picture decoder 44 and an inter-picture encoder 46. An intra-coded compressed video bit stream is applied to input 48 of the compressed frame reorder device 42. The input intra-coded video bit stream includes only I frames and therefore does not use frame reordering. However, the transcoder 40 provides an output compressed video bit stream on line 54 which does utilize inter-frame compression and therefore may include I, P or B frames. The inter-picture encoder 46 therefore must receive properly reordered frames. A conventional transcoder would generally include encoder reorder buffers to provide the desired frame reordering. As noted previously, the use of uncompressed frame reorder buffers unduly increases the cost and complexity of the transcoder. The improved transcoder 20 of FIG. 3 would generally not be suitable for use in the FIG. 4 application because the picture_coding_type is not the same for both input and output compressed bit streams.

The transcoder 40 of FIG. 4 provides reduced cost and complexity by utilizing compressed frame reorder buffers rather than uncompressed frame reorder buffers as in a conventional transcoder. The compressed frame reorder device 42 reorders the frames of the received intra-coded compressed video bit stream into an appropriate encoding order for the inter-picture encoder 46. The reordered intra-coded frames are applied via line 50 to the intra-picture decoder 44. The decoder 44 decodes the reordered frames to provide a digital video frame sequence in an order suitable for encoding. The decoded frames are then encoded in the inter-picture encoder 46 to provide the inter-frame encoded video bitstream at output 54. The reorder buffers utilized in compressed frame reorder device 42 are sized to hold compressed frames rather than uncompressed frames, and therefore are substantially smaller than the frame reorder buffers utilized in conventional transcoders. The transcoder 40 of FIG. 4 is particularly well-suited for use in applications in which a relatively small a priori upper bound can be placed on the size of the compressed frames in the intra-coded compressed video. Such applications include digital video cassette (DVC) and JPEG transcoding applications.

Although MPEG-2 applications generally exhibit a relatively large size variation between compressed frames, the transcoder 40 will provide advantages in those MPEG-2 applications in which it is known a priori that the maximum compressed frame size will be significantly smaller than the size of an uncompressed frame.

Figure 5:
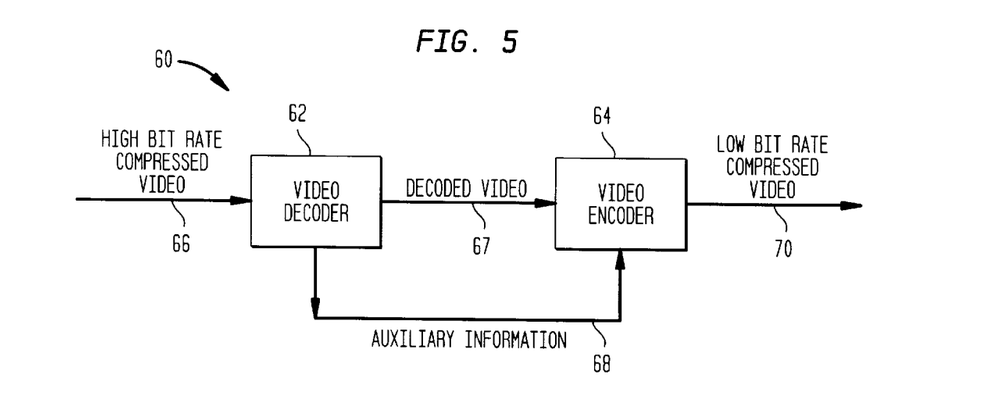
FIG. 5 shows a video transcoder with auxiliary information sent from decoder to encoder in accordance with the invention.

FIG. 5 shows another exemplary transcoder 60 in accordance with the present invention. As noted above, a conventional transcoder utilizes an encoder which performs repeat field detection, motion estimation, rate control and other encoding functions based solely on the input video pixels. The transcoder 60 of FIG. 5 provides reduced cost and complexity by utilizing auxiliary information supplied from a video decoder 62 to a video encoder 64. A high bit rate compressed video bit stream is applied to input 66 of the decoder 62. The decoder 62 decodes the high bit rate stream in a conventional manner to generate decoded video pixels which are supplied to encoder 64 via line 67. The decoding process also generates auxiliary information which is supplied via line 68 to the encoder 64. The auxiliary information may include motion vectors, quantization scales, number of bits used, motion compensation mode, discrete cosine transform (dct) type, repeat field information and picture type. These and other auxiliary information elements suitable for use in the transcoder 60 are described in greater detail in the above-cited MPEG-2 ISO reference.

The encoder 64 utilizes the auxiliary information supplied from the decoder 62 to generate a low bit rate compressed video bit stream at output 70. The use of auxiliary information from the decoder 62 simplifies the encoding process in encoder 64, and thereby substantially reduces the cost and complexity of the transcoder 60. For example, the encoder 64 could utilize the same motion vectors used in the input compressed bit stream applied to decoder 62, or could use these motion vectors to identify a reduced search region for use in the encoding process. The encoder 64 may utilize the same proportions of quantization scales and bits used as the input compressed bit stream even though the encoder is generating a lower bit rate output. The encoder 64 may also utilize the quantization scale and bits used information for rate control operations. The encoder 64 could utilize the same motion compensation mode, dct type, repeat field information and picture type utilized in the input compressed bit stream. The transcoder 60 may therefore be implemented using a simpler encoder than that typically required in a conventional transcoder. Furthermore, the transcoder 60 may exhibit higher levels of performance because it can base its encoding decisions in part on decoded pixels before the addition of further quantization noise. An exemplary application for the transcoder 50 is the conversion of an encoded video bit stream from a 4:2:2 chrominance format to a 4:2:0 chrominance format. The transcoder 50 will also provide advantages in numerous other applications.

The use of motion vectors as auxiliary information in the transcoder of FIG. 5 will now be described in greater detail. In a first embodiment, the encoder 64 utilizes the same motion vectors of the input compressed bit stream in the output compressed bit stream. In a second embodiment, the encoder 64 performs a reduced search around a motion vector from the input bit stream to find a corresponding motion vector for the output bit stream. For example, if the first stream uses the motion vector (x, y), the encoder 64 measures errors for a number of vectors with coefficients in the set (x−p x−p+1 . . . x+p, y−q y−q+1 . . . y+q) given constants p and q, and selects the vector with the smallest error for use in the output bit stream. In a third embodiment, the encoder 64 performs a new search to find a new output stream vector, compares the vector to the corresponding vector from the input stream, and selects the best of the two vectors for use in the output stream. In a fourth embodiment, the encoder 64 performs a reduced search around a motion vector from the input bit stream to find a "decoded bit stream derived" motion vector, performs a new search to find an "independent" motion vector, compares the decoded bit stream derived motion vector and the independent motion vector and selects the best of the two vectors for use in the output bit stream.

The use of quantization scale as auxiliary information in the transcoder of FIG. 5 will now be described in greater detail. An exemplary embodiment computes, for each macroblock in the input compressed bit stream, the ratio of the quantization scale used for the macroblock to the average quantization scale used in the corresponding picture. The encoder 64 then uses this ratio to perform "adaptive quantization" in generating the output bit stream. For example, a large ratio for a given macroblock indicates that the encoder should use a large quantization scale for encoding that macroblock, and a small ratio for a given macroblock indicates that the encoder should use a small quantization scale for encoding that macroblock.

The use of number of bits as auxiliary information in the transcoder of FIG. 5 will now be described in greater detail. An exemplary embodiment computes a target number of bits for a given picture to be encoded, computes ratios of the number of bits used to encode each macroblock of the input stream relative to the total number of bits used for the corresponding picture in the input stream, and divides the picture target among the macroblocks to be encoded based on the ratio of bits used by each macroblock in the input bit stream. For example, the ratios used for the output bit stream may be selected as proportional to the ratios used for the input bit stream. As each macroblock is encoded, the encoder 64 keeps track of the total number of bits used versus a running sum of macroblock bit budgets. If the total number of bits used is greater than the running sum of macroblock bit budgets, the encoder increases the quantization scales. If the total number of bits used is less than the running sum of macroblock bit budgets, the encoder decreases the quantization scales. The use of motion vectors, quantization scales, number of bits used and other auxiliary information in the manner described above simplifies the encoder 64 and thereby the transcoder 60.

Figure 6:
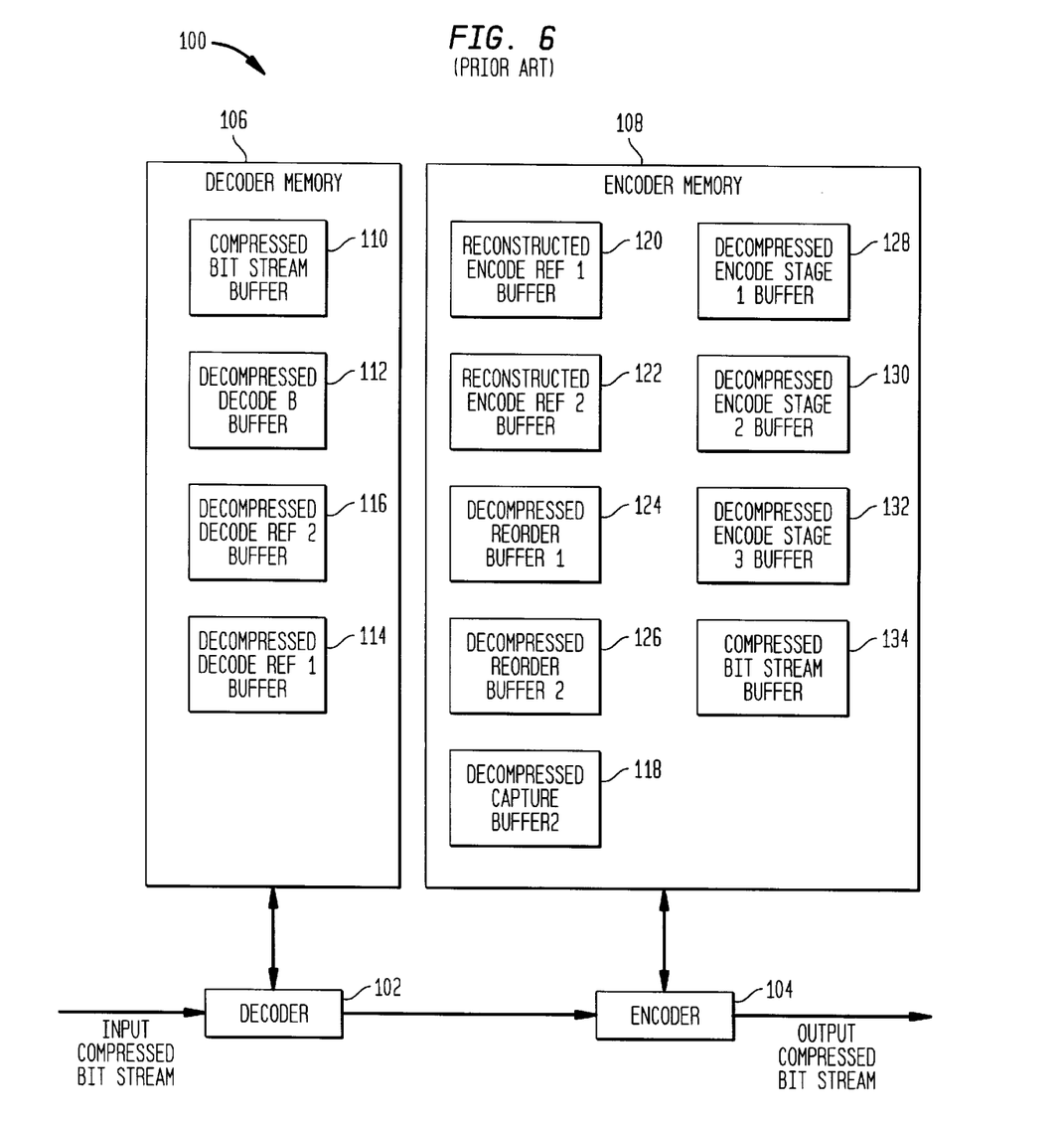
FIG. 6 illustrates the memory buffer requirements of an exemplary prior art transcoder.

FIG. 6 illustrates the internal memory buffer requirements of an exemplary prior art video transcoder 100. The transcoder 100 includes a decoder 102 which accesses a decoder memory 106 in the process of decoding an input compressed bit stream to generate a decoded video frame sequence. The transcoder 100 further includes an encoder 104 which accesses an encoder memory 108 in the process of encoding the decoded video frame sequence to generate an output compressed bit stream. The decoder memory 106 includes a compressed bit stream buffer 110 for storing portions of a compressed bit stream to be transcoded. The decoder memory 106 further includes a decompressed decode B buffer 112 for storing a decompressed B frame, and decompressed decode ref1 and ref2 buffers 114, 116 for storing decompressed first and second reference frames, respectively, needed to decode a given B frame.

The encoder memory 108 includes a decompressed capture buffer 118 for storing decompressed frame data received from the decoder 102, and reconstructed encode ref1 and ref2 buffers 120, 122 for storing the first and second reference frames, respectively, needed to encode a given B frame.

The encoder memory 108 further includes first and second decompressed reorder buffers 124, 126 for holding frames during a frame reordering process. It will be assumed without limitation for FIG. 6 and the remaining FIGS. 7–11 that there will be at most two B frames between a given pair of reference frames. The encoder memory 108 therefore includes only two encoder reorder buffers 124, 126. The encoder 104 in exemplary prior art transcoder 100 uses a three-stage encoding pipeline, and therefore encoder memory 108 includes a decompressed encode stage 1 buffer 128, a decompressed encode stage 2 buffer 130 and a decompressed encode stage 3 buffer 132. The encoder memory also includes a compressed bit stream buffer 134 for supplying the output compressed bit stream at a desired bit rate. The prior art transcoder 100 therefore stores a total of 11 uncompressed frames. As noted previously, this unduly increases the memory requirements and therefore the cost and complexity of the conventional transcoder 100.

Figure 7:
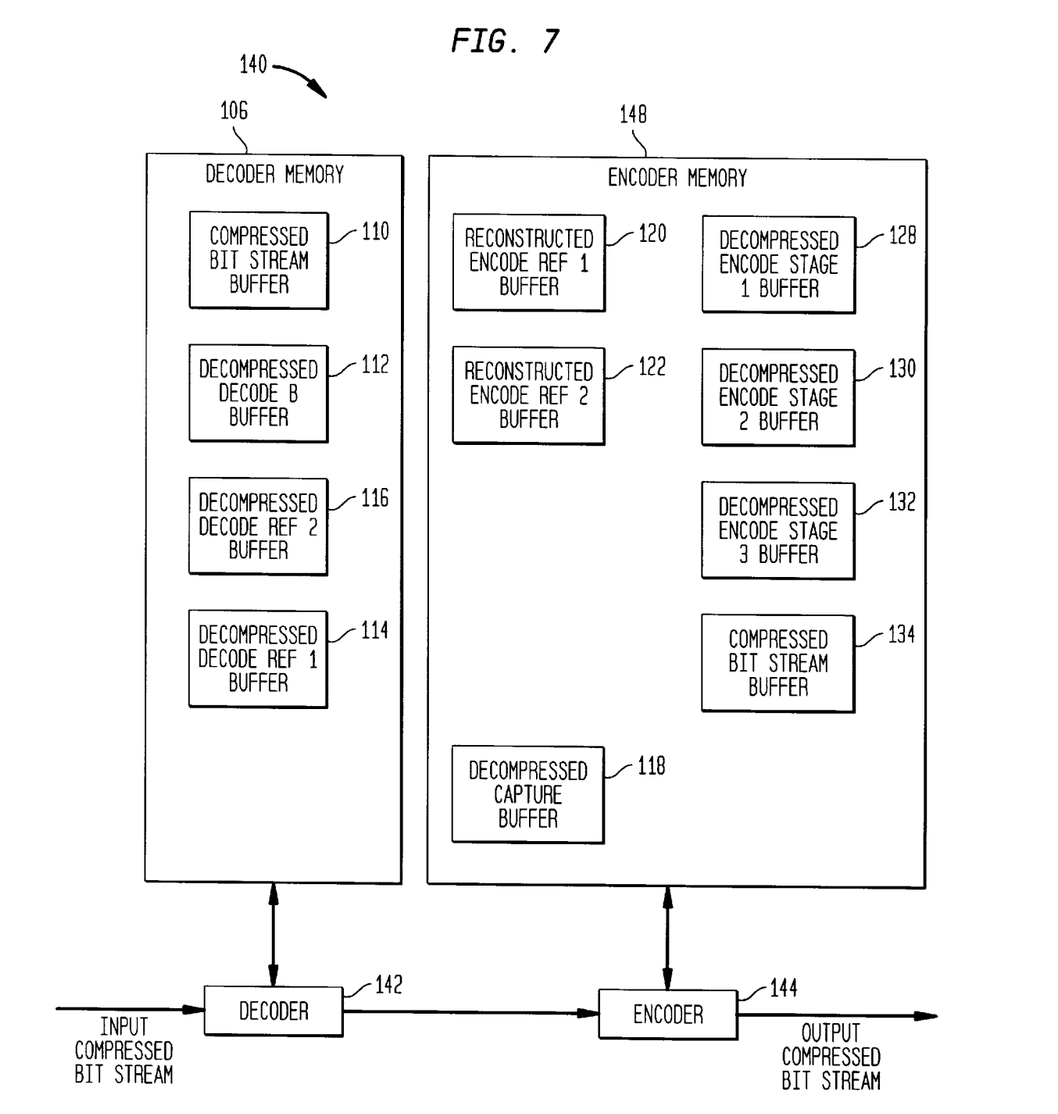
FIGS. 7 and 8 show exemplary encode order transcoders in accordance with the present invention.

FIG. 7 illustrates the memory buffer requirements for an exemplary encode order video transcoder 140 in accordance with the invention. The transcoder 140 may operate in the manner described above in conjunction with transcoder 20 of FIG. 3. The transcoder 140 includes a decoder 142 which utilizes a conventional decoder memory 106 in the process of decoding an input compressed bit stream to generate a decoded video frame sequence. The transcoder 140 further includes an encoder 144 which utilizes an encoder memory 148 in the process of encoding the decoded video frame sequence to generate an output compressed bit stream. The encoder memory 148 includes the above-described buffers 118, 120, 122, 128, 130, 132 and 134, but eliminates the reorder buffers 124, 126 of prior art transcoder 100. The exemplary encode order transcoder 140 in accordance with the present invention thus stores a total of 9 uncompressed frames, and can therefore be implemented with less memory capacity and therefore reduced cast and complexity relative to the prior art transcoder 100 of FIG. 6. Although a three-stage encoding pipeline is assumed in the transcoders of FIGS. 7–11 herein, it should be emphasized that this is not a requirement of the invention. The invention may be implemented using transcoders which utilize other types of encoding pipelines. For example, a one-stage encoding pipeline may be used, in which case the transcoders of FIGS. 7–11 would each include two fewer uncompressed frame buffers.

Figure 8:
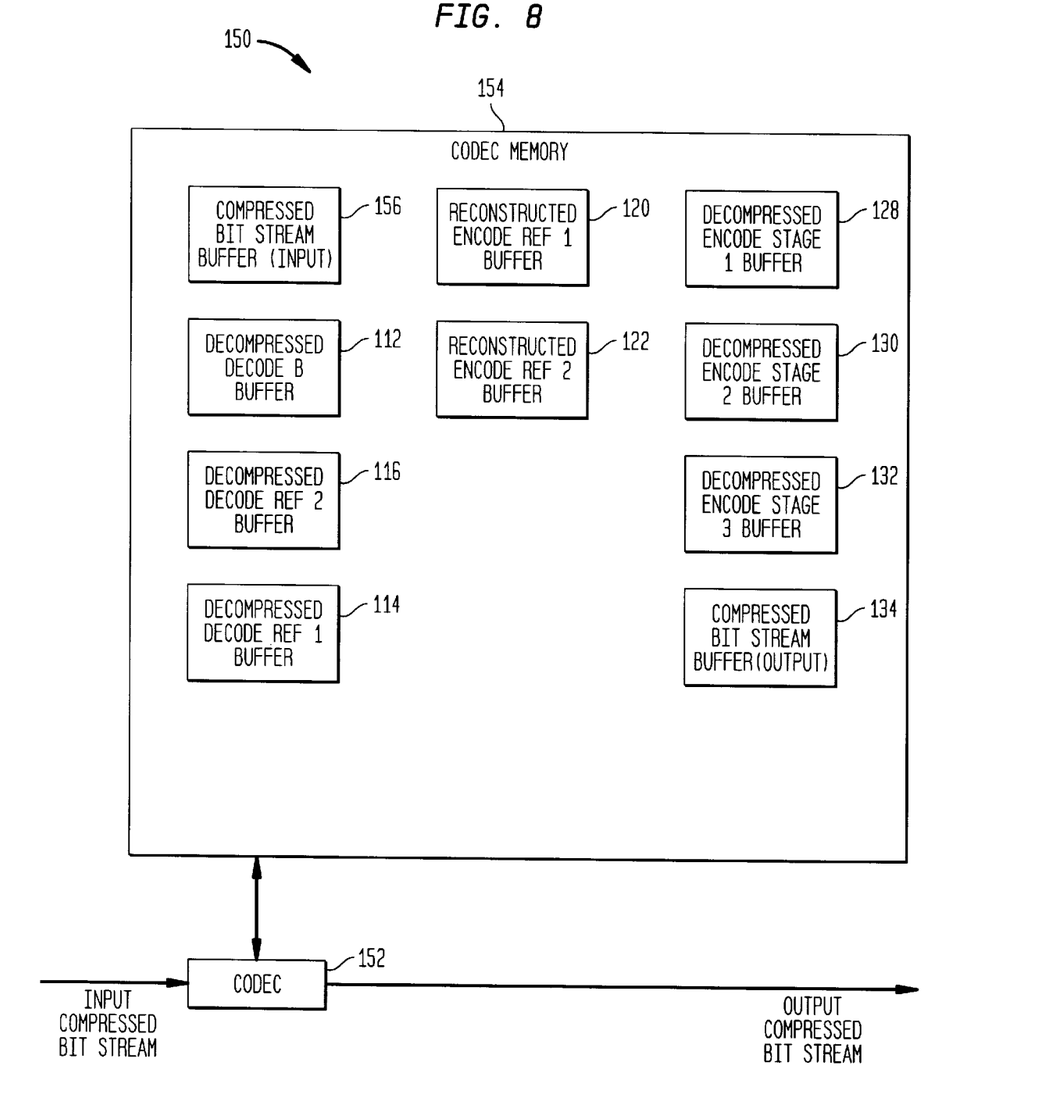

FIG. 8 shows an encode order transcoder 150 which represents an alternative embodiment of the encode order video transcoder 140 of FIG. 7. The transcoder 150 includes a codec 152 which performs both decoding and encoding operations using a single codec memory 154. The codec memory 154 includes an input compressed bit stream buffer 156 and an output compressed bit stream buffer 158. The codec memory 154 includes the above-described buffers 112, 114, 116, 120, 122, 128, 130 and 132, but the use of a shared memory for both decoding and encoding eliminates the decompressed capture buffer 118 of FIG. 7. The transcoder 150 therefore stores a total of 8 uncompressed frames.

Figure 9:
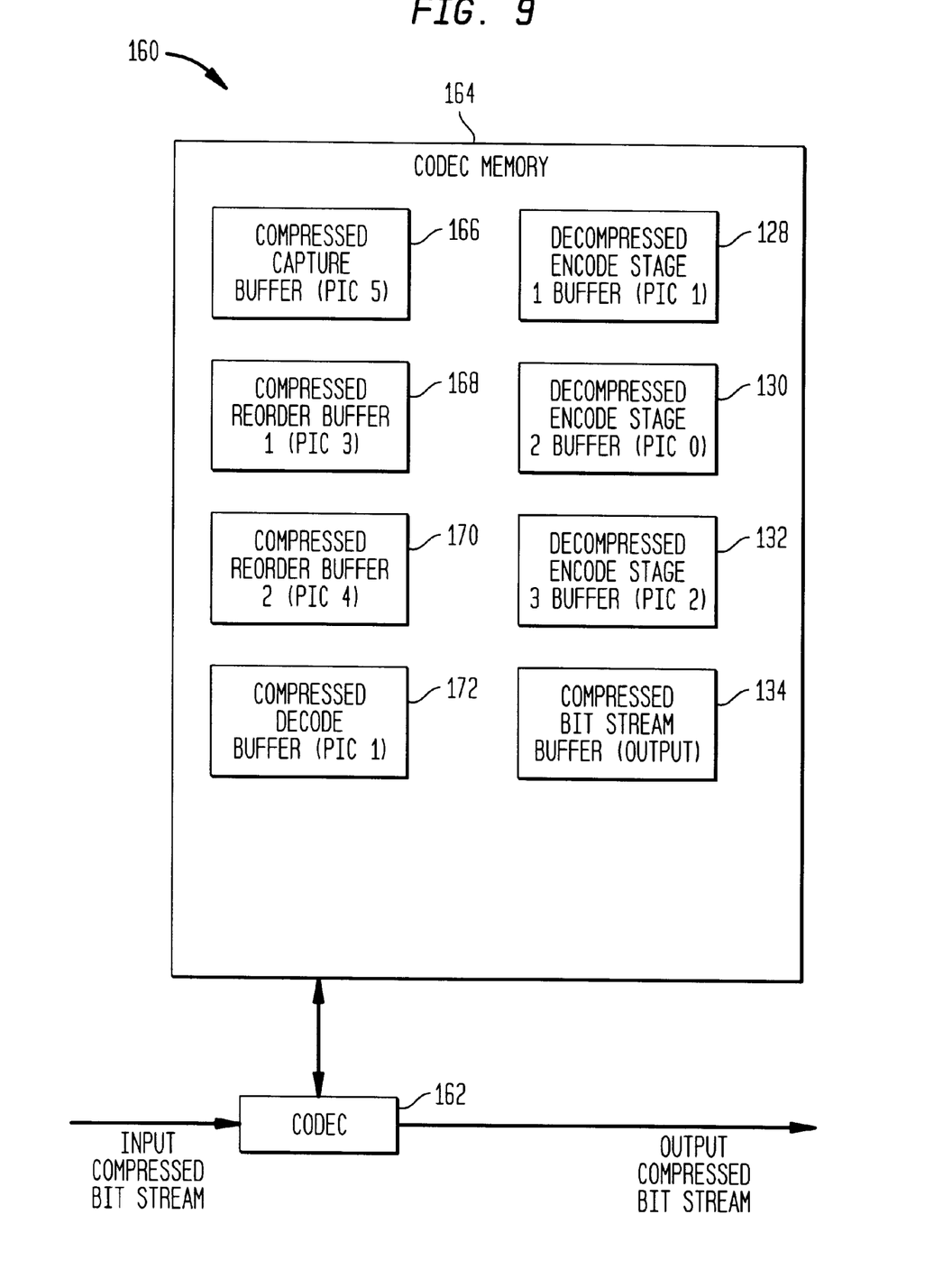
FIGS. 9–11 illustrate the memory buffer requirements of an exemplary compressed frame reorder transcoder in accordance with the invention.

FIG. 9 shows an exemplary compressed frame reorder transcoder 160 in accordance with the invention. The transcoder 160 operates in a manner similar to that described above in conjunction with transcoder 40 of FIG. 4. It is assumed without limitation for the following description that every third frame in the video frame sequence is a reference I or P frame and that the other frames of the sequence are B frames. The frames are numbered in display order so that frames 2, 5, 8, . . . are reference frames and the remaining frames 0, 1, 3, 4, 6, 7, . . . are B frames. These frames are referred to in FIGS. 9–11 using the notation "pic" indicating picture or frame number. The transcoder 160 as shown in FIG. 9 includes a codec 162 which performs both decoding and encoding operations. The transcoder 160 also includes a codec memory 164 having the above-described buffers 128, 130, 132 and 158 of the FIG. 8 transcoder 150. The transcoder 160 further includes a compressed capture buffer 166 for storing portions of an input compressed bit stream, first and second compressed reorder buffers 168, 170 for use in reordering compressed frames as described in conjunction with FIG. 4 above, and a compressed decode buffer 172 for storing compressed data to be decoded.

Figure 10:
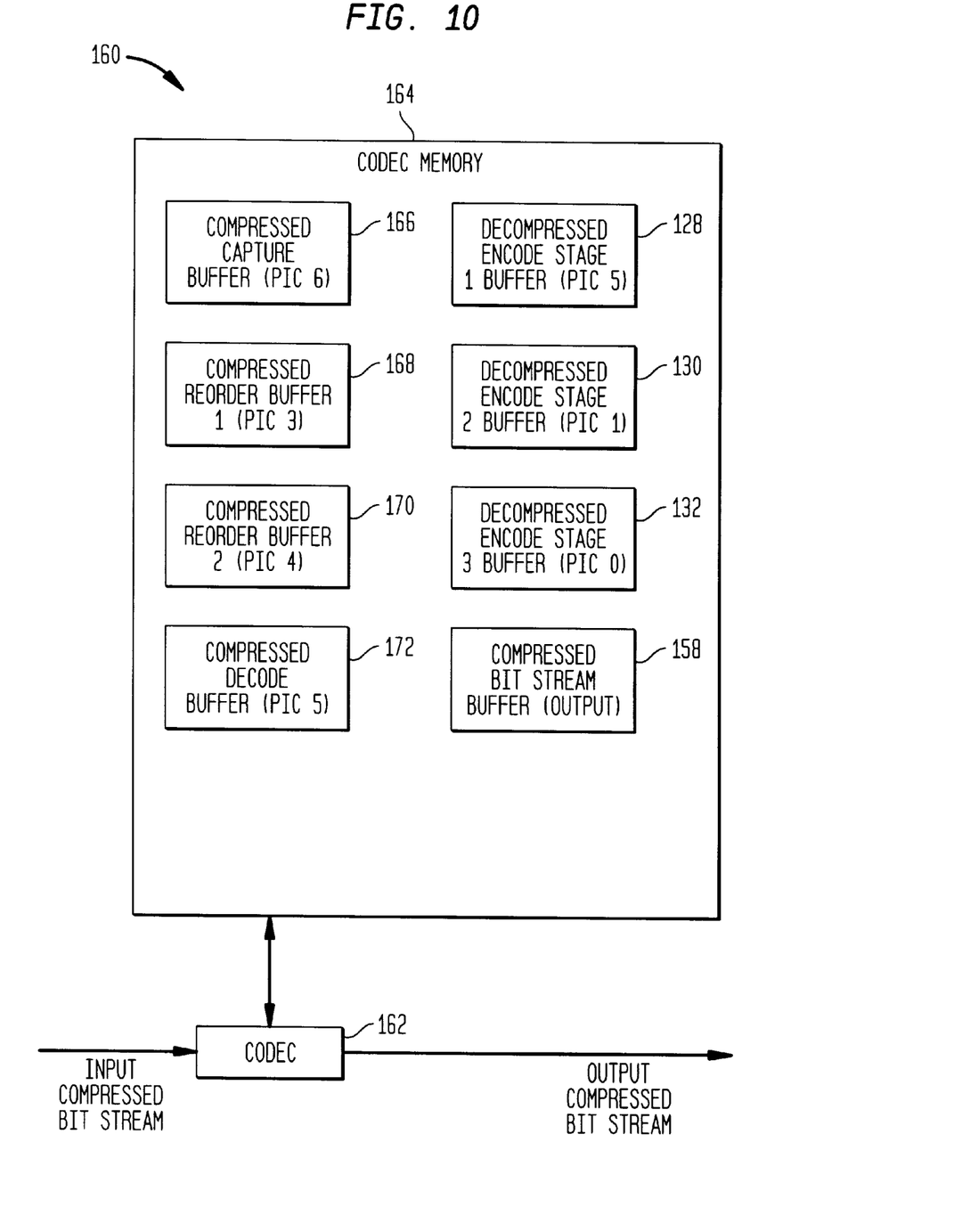
Figure 11:
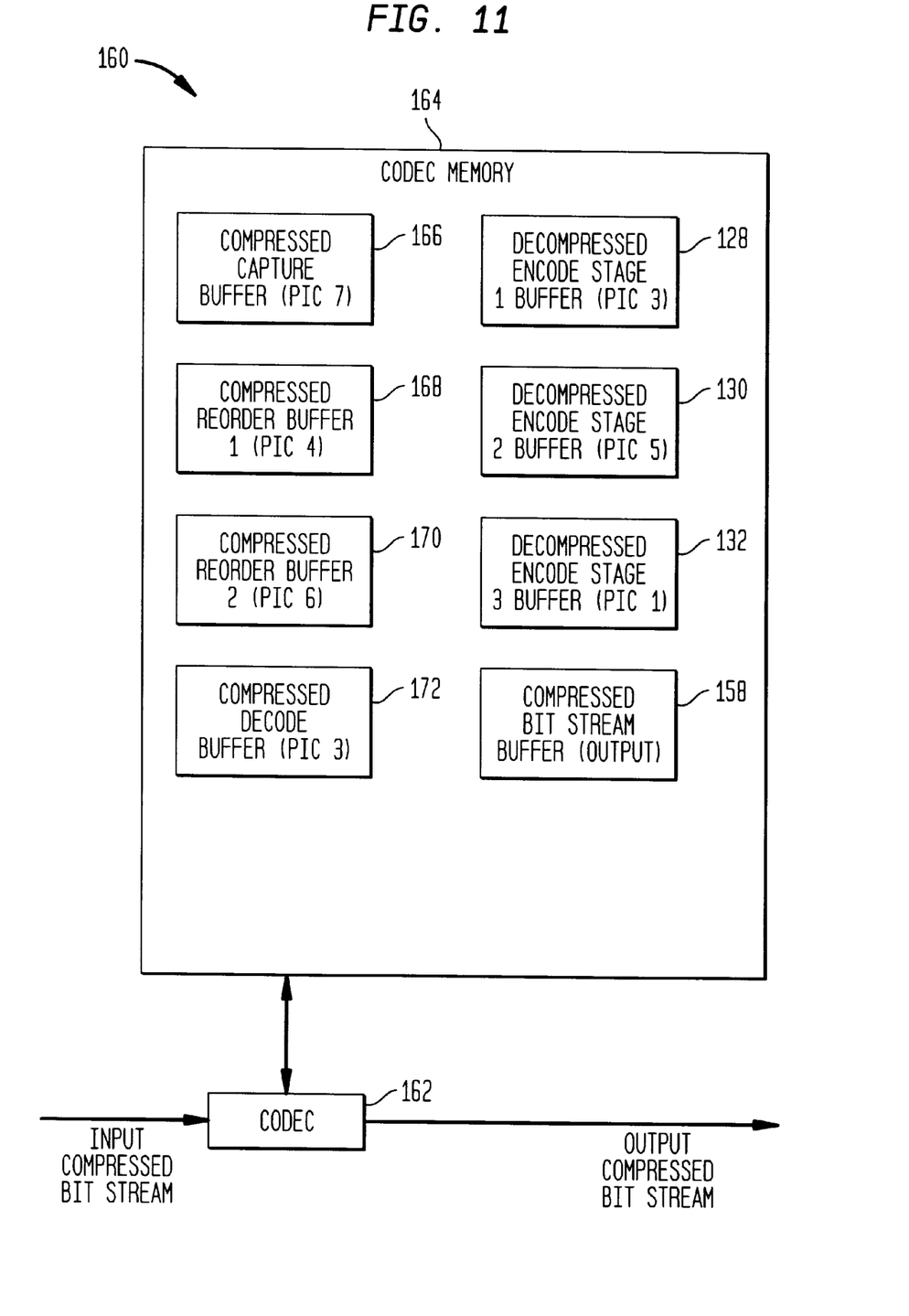

FIGS. 9–11 illustrate the buffer contents in transcoder 160 for an exemplary video frame sequence. FIG. 9 shows the buffer contents of transcoder 160 as reference frame 5 is being captured and the encoding process is being completed on reference frame 2. It can be seen that buffers 166, 168, 170 and 172 contain compressed frames 5, 3, 4 and 1, respectively, and buffers 128, 130 and 132 contain decompressed frames 1, 0 and 2, respectively. FIG. 10 shows the buffer contents of transcoder 1 60 one frame period later in time relative to FIG. 9, as B frame 6 is being captured and the encoding process is being completed on B frame 0. Buffers 166, 168, 170 and 172 contain compressed frames 6, 3, 4 and 5, respectively, and buffers 128, 130 and 132 contain decompressed frames 5, 1 and 0, respectively. FIG. 11 shows the buffer contents of transcoder 160 two frame periods later in time relative to FIG. 9, as B frame 7 is being captured and the encoding process is being completed on B frame 1. Buffers 1 66, 168, 170 and 172 contain compressed frames 7, 4, 6 and 3, respectively, and buffers 1 28, 130 and 132 contain decompressed frames 3, 5 and 1, respectively. The transcoder 160 can thus process video frame sequences using only three decompressed frame buffers 128, 130 and 132, four compressed frame buffers 166, 168, 170 and 172 and one buffer 158 for bit stream output. This represents a substantial reduction in memory capacity and therefore transcoder cost and complexity relative to the conventional transcoder 100 of FIG. 6.

It should be understood that the foregoing description is merely illustrative of the invention. Numerous alternative embodiments within the scope of the appended claims will be apparent to those of ordinary skill in the art.

The claimed invention is:

1. A compressed video transcoder for receiving a first compressed video stream and outputting a second compressed video stream, said transcoder comprising:

an encode order video decoder having an input connected to receive a first compressed video bit stream, the encode order video decoder decoding the first compressed video bit stream to provide at an output of the decoder a sequence of frames in an order suitable for direct encoding without further reordering; and an encode order video encoder having an input directly connected to the output of the encode order video decoder, wherein the encode order video encoder directly encodes the sequence of frames without further reordering thereof to provide a second compressed video bit stream and wherein a delay in encoding said sequence of frames is substantially equal whether said frames are I, P or B picture frames.

2. The transcoder of claim 1 wherein the first and second compressed video bit streams have different bit rates.

3. The transcoder of claim 1 wherein the first and second compressed video bit streams have different resolutions.

4. A method for transcoding a first compressed video bit stream to produce a second compressed video bit stream, the method comprising the steps of:

decoding, via an encode order video decoder, the first compressed video bit stream to provide a sequence of frames in an order suitable for direct encoding without further reordering; and     encoding, via an encode order video encoder, the sequence of frames received from said decoder and being directly connected thereto, without further reordering thereof to provide the second compressed video bit stream, and     wherein a delay in encoding said sequence of frames is substantially equal whether said frames are I, P or B picture frames.

5. The method of claim 4 wherein the first and second compressed video bit streams have different bit rates.

6. The method of claim 4 wherein the first and second compressed video bit streams have different resolutions.

7. A compressed video transcoder for receiving a first compressed video stream and outputting a second compressed video stream, said transcoder comprising:

a compressed frame reorder device having an input connected to receive a first compressed video bit stream, the reorder device reordering compressed frames of the first compressed video bit stream into an encode order such that a subsequent encoding operation performed after decoding the first compressed video bit stream can be performed without further reordering of the frames;

a decoder connected to receive the reordered compressed frames of the first compressed video bitstream, the decoder decoding the reordered compressed frames to provide a sequence of decoded video frames in the encode order; and     an encoder directly connected to the decoder to receive the decoded video frames in the encode order from the decoder and to generate therefrom the second compressed video bit stream without further reordering of the decoded video frames,     wherein the frames in said second compressed video bit stream are in a different order then the frames in said first compressed video bit stream.

8. The apparatus of claim 7 wherein the compressed frame reorder device includes frame reorder buffers sized to hold one or more compressed frames of the first compressed video bitstream.

9. The apparatus of claim 7 wherein the first compressed video bit stream includes only I pictures and the second compressed video bit stream includes at least one B picture.

10. The apparatus of claim 7 wherein the second compressed video bit stream includes I, P and B pictures.

11. A method for transcoding a first compressed video bit stream to produce a second compressed video bit stream, the method comprising the steps of:

reordering compressed frames of the first compressed video bit stream into an encode order such that a subsequent encoding operation performed after decoding the first compressed video bit stream can be performed without further reordering of the frames;

decoding, via an encoder the reordered compressed frames to provide a sequence of decoded video frames in the encode order; and     encoding, via an encoder the sequence of decoded video frames received from said decoder and being directly connected thereto, in the encode order to generate therefrom the second compressed video bit stream without further reordering of the decoded video frames,     wherein the frames in said second compressed video bit stream are in a different order then the frames in said first compressed video bit stream.

12. The method of claim 11 wherein the step of reordering further includes the step of storing one or more of the compressed frames of the first compressed video bit stream in reorder buffers sized to hold the compressed frames.

13. The method of claim 11 wherein the first compressed video bit stream includes only I pictures and the second compressed video bit stream includes at least one B picture.

14. The method of claim 11 wherein the second compressed video bit stream includes I, P and B pictures.

15. A compressed video transcoder for receiving a first compressed video stream and outputting a second compressed video stream, said transcoder comprising:

a video decoder having an input connected to receive a first compressed video bit stream, the video decoder decoding the first compressed video bit stream to provide at an output of the decoder a sequence of frames;

a video encoder having an input directly connected to the output of the video decoder, wherein the video encoder directly decodes the sequence of frames without further reordering thereof to provide a second compressed video bit stream; and     at least one signal line coupled between the decoder and the encoder for supplying auxiliary information from the decoder to the encoder regarding the first compressed video bit stream, wherein the video encoder utilizes the auxiliary information to simplify the encoding which produces the second compressed video bit stream, wherein the auxiliary information includes at least one motion vector used in at least one region of a picture in the first compressed video bit stream or includes a quantization scale used in at least one region of a picture in the first compressed video bit stream or includes a number of bits used in at least one region of a picture in the first compressed video bit stream or includes an indication of a motion compensation mode used in at least one region of a picture in the first compressed video bit stream or includes a repeat field indication for a picture in the first compressed video bit stream,     wherein a delay in encoding said sequence of frames is substantially equal whether said frames are I, P or B picture frames.

16. A method for transcoding a first compressed video bit stream to produce a second compressed video bit stream, the method comprising the steps of:

decoding the first compressed video bit stream in a video decoder to provide a sequence of frames;

directly encoding the sequence of frames in a video encoder without reordering said sequence to provide a second compressed video bit stream; and     supplying auxiliary information from the video decoder to the video encoder regarding the first compressed video bit stream, wherein the video encoder utilizes the auxiliary information to simplify the encoding which provides the second compressed video bit stream, wherein the auxiliary information includes at least one motion vector used in at least one region of a picture in the first compressed video bit stream or includes a quantization scale used in at least one region of a picture in the first compressed video bit stream or includes a number of bits used in at least one region of a picture in the first compressed video bit stream or includes an indication of a motion compensation mode used in at least one region of a picture in the first compressed video bit stream or includes a repeat field indication for a picture in the first compressed video bit stream, a delay in encoding said sequence of frames is substantially equal whether said frames are I, P or B picture frames.

* * * * *